(12) United States Patent
Hanriot

(10) Patent No.: US 12,221,040 B2
(45) Date of Patent: Feb. 11, 2025

(54) ELECTRICAL CABLE GUIDING DEVICE FOR AN AUTOMOTIVE VEHICLE SEAT TRACK

(71) Applicant: FAURECIA Sièges d'Automobile, Nanterre (FR)

(72) Inventor: Benoît Hanriot, Sainte Honorine la Guillaume (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 590 days.

(21) Appl. No.: 17/474,690

(22) Filed: Sep. 14, 2021

(65) Prior Publication Data

US 2022/0080911 A1  Mar. 17, 2022

(30) Foreign Application Priority Data

Sep. 15, 2020 (FR) .................................... 20 09350

(51) Int. Cl.
| | |
|---|---|
| *B60R 16/02* | (2006.01) |
| *B60N 2/06* | (2006.01) |
| *B60R 16/037* | (2006.01) |
| *B60N 2/015* | (2006.01) |

(52) U.S. Cl.
CPC .......... *B60R 16/0215* (2013.01); *B60N 2/067* (2013.01); *B60R 16/037* (2013.01); *B60N 2/015* (2013.01)

(58) Field of Classification Search
CPC .............. B60R 16/037; B60R 16/0215; B60N 2/02253; B60N 2/067; B60N 2/0264; B60N 2/0747; B60N 2/0715; B60N 2/0722; B60N 2002/0236
See application file for complete search history.

(56) References Cited

U.S. PATENT DOCUMENTS

| | | | | |
|---|---|---|---|---|
| 6,494,523 | B2* | 12/2002 | Kobayashi | .......... B60R 16/0207 |
| | | | | 361/826 |
| 6,997,499 | B2* | 2/2006 | Tsubaki | ............... B60N 2/0732 |
| | | | | 296/65.13 |
| 7,000,967 | B2* | 2/2006 | Oshima | .................. B60N 2/067 |
| | | | | 296/65.01 |
| 7,053,306 | B2* | 5/2006 | Tsubaki | ............... H02G 11/006 |
| | | | | 174/72 A |
| 7,057,110 | B2* | 6/2006 | Tsubaki | ................. H02G 11/00 |
| | | | | 174/72 A |
| 7,238,029 | B2 | 7/2007 | Tsubaki | |
| 7,910,832 | B2* | 3/2011 | Pieh | ...................... E05F 15/655 |
| | | | | 378/194 |
| 8,841,551 | B2* | 9/2014 | Sekino | ................. H02G 3/0468 |
| | | | | 174/68.3 |
| 9,308,833 | B2* | 4/2016 | Sekino | .................... B60N 2/071 |
| 9,573,536 | B2* | 2/2017 | Katou | .................... B60R 16/027 |

(Continued)

FOREIGN PATENT DOCUMENTS

| | | |
|---|---|---|
| DE | 102006002909 A1 | 9/2006 |
| DE | 112018003695 T | 3/2020 |
| DE | 102019135747 A | 7/2020 |

*Primary Examiner* — Jason S Morrow
(74) *Attorney, Agent, or Firm* — Barnes & Thornburg LLP

(57) ABSTRACT

A device for guiding at least one electrical cable for powering a track actuator of a vehicle seat, the device comprises a housing, adapted to receive at least one portion of the electrical cable; a slide, mounted slidingly on the housing; and a means for fixing the electrical cable onto the slide.

16 Claims, 6 Drawing Sheets

(56) References Cited

U.S. PATENT DOCUMENTS

Figure 1:
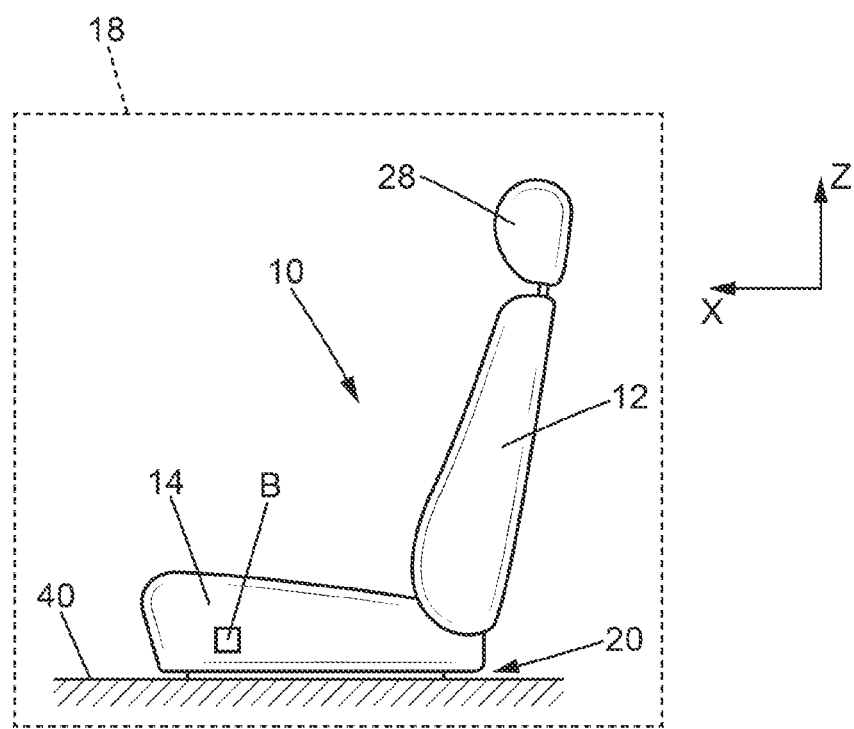

| | | | |
|---|---|---|---|
| 10,214,168 B1* | 2/2019 | Yamamoto | B60R 22/26 |
| 10,384,624 B2* | 8/2019 | Kato | B60N 2/0224 |
| 10,513,203 B2* | 12/2019 | Ito | B60N 2/067 |
| 10,780,848 B2* | 9/2020 | Ogihara | H01B 7/0045 |
| 11,203,308 B2* | 12/2021 | Yamamoto | B60N 2/0722 |
| 11,433,786 B2* | 9/2022 | Okumura | B60N 2/07 |
| 11,511,685 B2 | 11/2022 | Yamamoto | |
| 11,554,691 B2 | 1/2023 | Petot | |
| 2009/0020331 A1* | 1/2009 | Tsubaki | B60R 16/0207 |
| | | | 174/72 A |
| 2009/0035953 A1* | 2/2009 | Tsubaki | H02G 11/006 |
| | | | 439/34 |
| 2013/0181512 A1* | 7/2013 | Terada | B60R 16/0215 |
| | | | 307/10.1 |
| 2020/0139907 A1* | 5/2020 | Sano | B60N 2/0715 |
| 2022/0219569 A1* | 7/2022 | Zhao | B60N 2/08 |
| 2023/0411940 A1* | 12/2023 | Ji | H02G 11/00 |

\* cited by examiner

US 12,221,040 B2

ELECTRICAL CABLE GUIDING DEVICE FOR AN AUTOMOTIVE VEHICLE SEAT TRACK

PRIORITY CLAIM

This application claims priority to French Application No. FR 20 09350, filed Sep. 15, 2020, which is expressly incorporated by reference herein.

BACKGROUND

The present disclosure relates to an electrical cable guiding device for an automotive vehicle seat track, to a track system comprising such a guiding device, and to an automotive vehicle comprising such a track system.

SUMMARY

According to the present disclosure, a device for guiding at least one electrical cable for powering a vehicle seat track actuator is proposed. The device comprising:
 a housing adapted to receive at least one portion of the electrical cable;
 a slide slidingly mounted on the housing; and
 a means for fixing the electrical cable onto the slide.

In illustrative embodiments, the cable is guided by the slide and is protected, in large part, by the housing. It is thus possible to limit or even prevent the risk of the cable interfering with the track.

In illustrative embodiments, the cable guiding device may comprise one or more of the following characteristics, taken alone or in combination:
 the housing has a "U"-shaped section, the "U"-shaped section being open on one side of the housing, at the level from which the slide is mounted;
 the slide presents a first portion with a "U"-shaped section;
 the opening of the "U"-shaped section of the housing is oriented towards the opening of the "U"-shaped section of the slide;
 the slide presents a second, substantially flat portion, the second portion preferably presenting a flange on a side intended to be oriented towards the track;
 the means for fixing the electrical cable onto the slide is arranged on the second portion of the slide;
 the fixation means is adapted to fixedly maintain at least one portion of the electrical cable extending between the fixation means and the track actuator, in relation to the slide;
 the fixation means comprises a "U"-shaped hook adapted to sandwich the electrical cable with a wall of the slide;
 the housing presents at least one opening distinct from the opening of the "U"-shaped section of the housing;
 the guiding device comprises a second slide mounted slidingly on the housing, the slide and the second slide preferably being identical; and
 the slide and the second slide are arranged one behind the other along a side of the housing.

In illustrative embodiments, a track system for an automotive vehicle seat or seats is described, the system comprises:
 a track, comprising a fixed rail, a mobile rail and an actuator to displace the mobile rail in relation to the fixed rail;
 a cable fixed to the actuator; and
 a guiding device such as described above, in all its combinations, the cable being fixed to the slide.

In illustrative embodiments, the track system may comprise:
 a second mobile rail and a second actuator to displace the second mobile rail in relation to the fixed rail;
 a second cable fixed to the second actuator; the second cable being fixed to the second slide.

In illustrative embodiments, a vehicle is described, in particular an automotive vehicle, comprising a body, at least one vehicle seat, a track system such as described above, in all its combinations, such that the fixed rail of the track is fixed to the body of the vehicle, and a floor, disposed on the body or formed by the body, the housing being disposed between the bottom of the body and the floor.

In illustrative embodiments, a method of implementing a track system such as described above is described, in all its combinations, comprising the step consisting of controlling a displacement of the mobile rail in relation to the fixed rail by means of the actuator, the displacement of the mobile rail causing a displacement of the cable that in turn causes the displacement of the slide.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
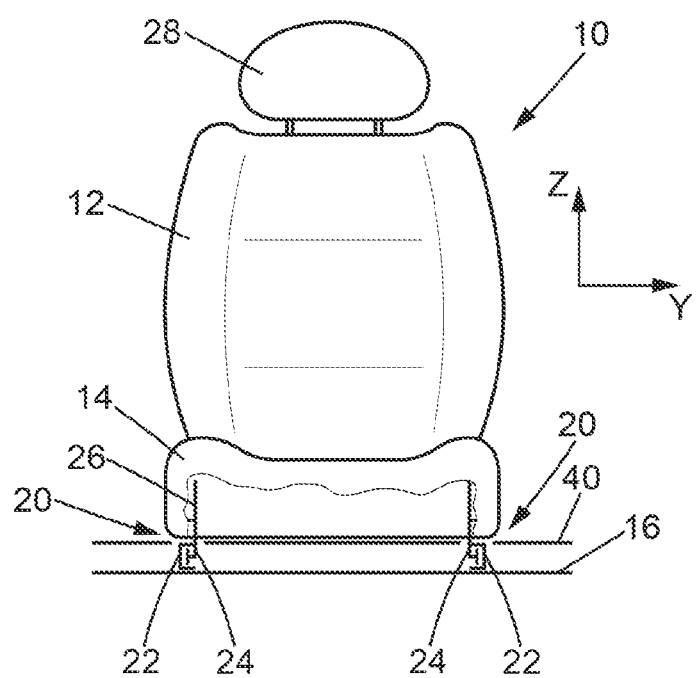
Figure 3:
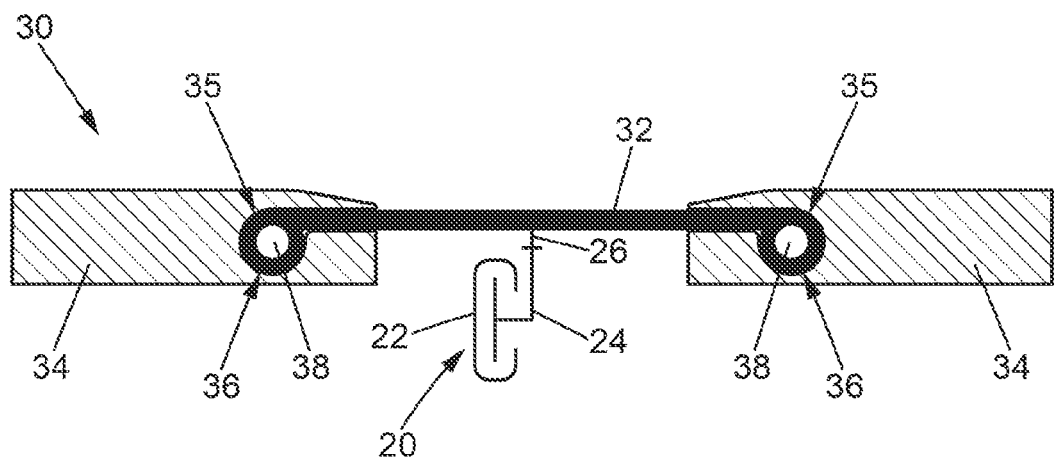
Figure 4:
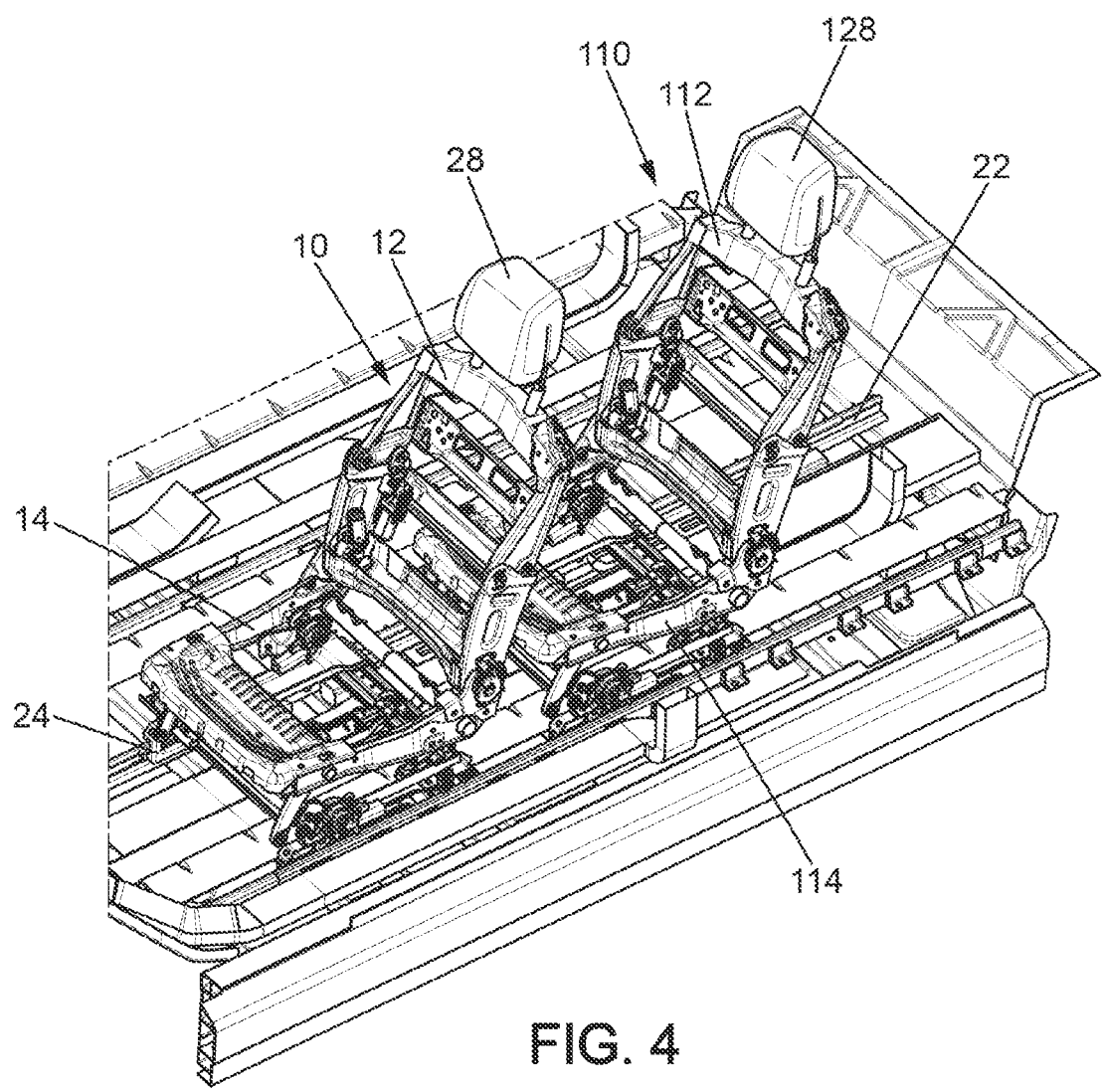
Figure 5:
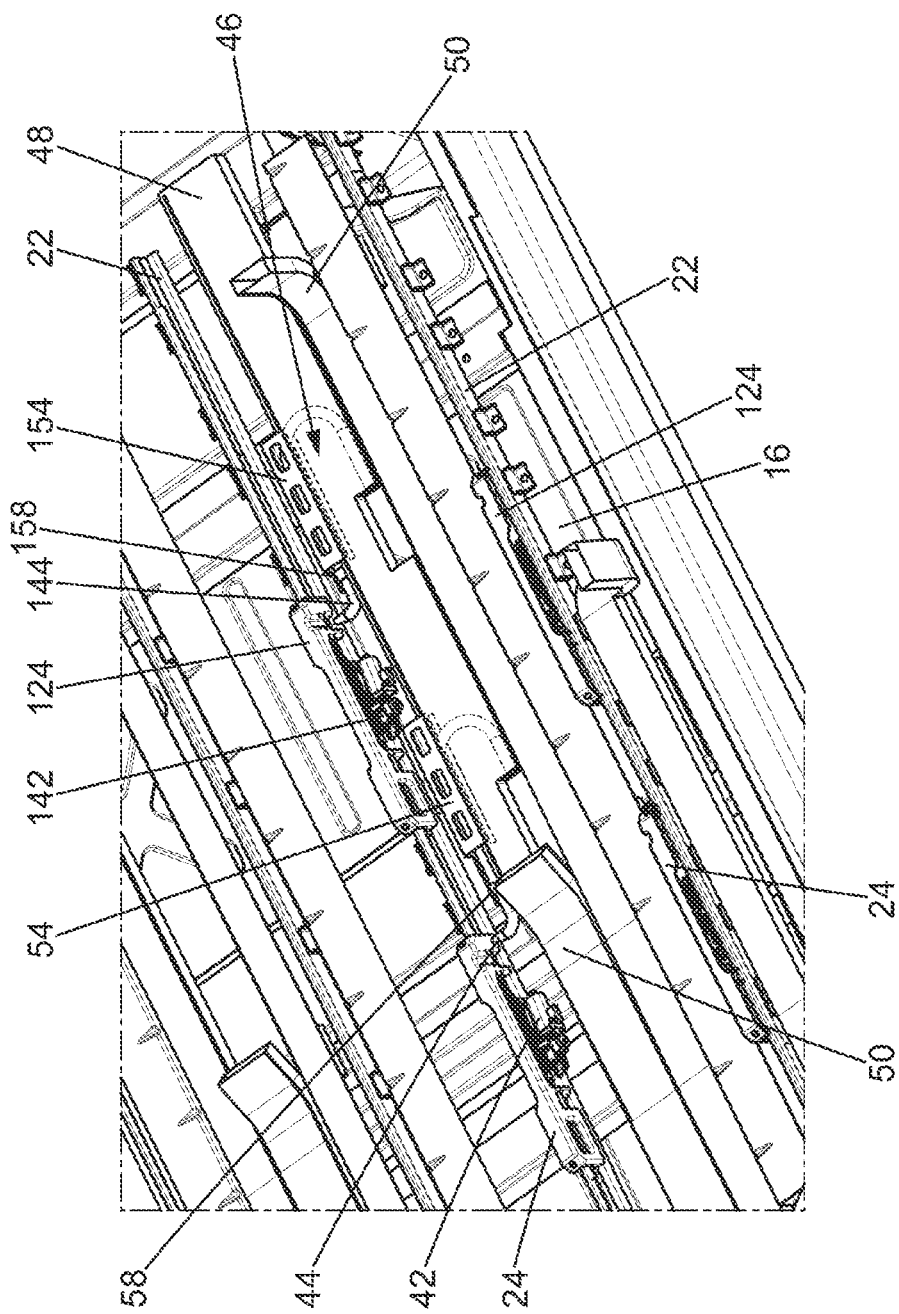
Figure 6:
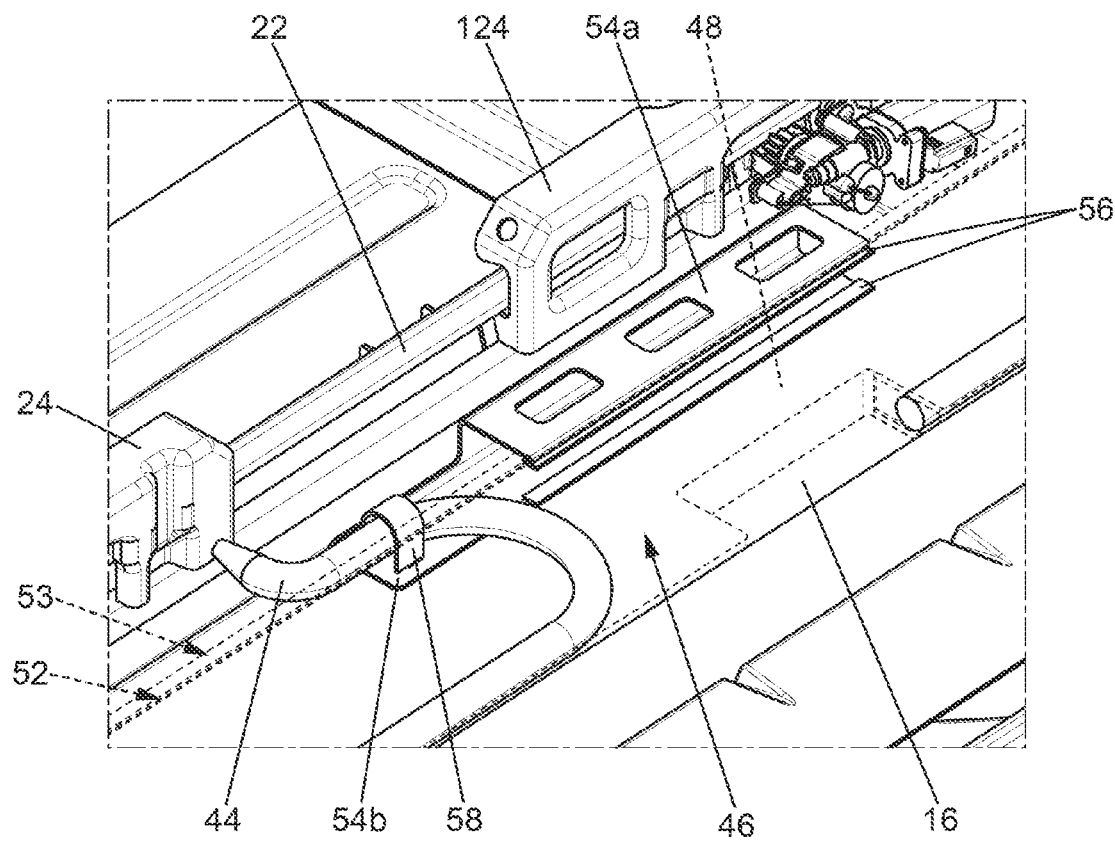
Figure 7:
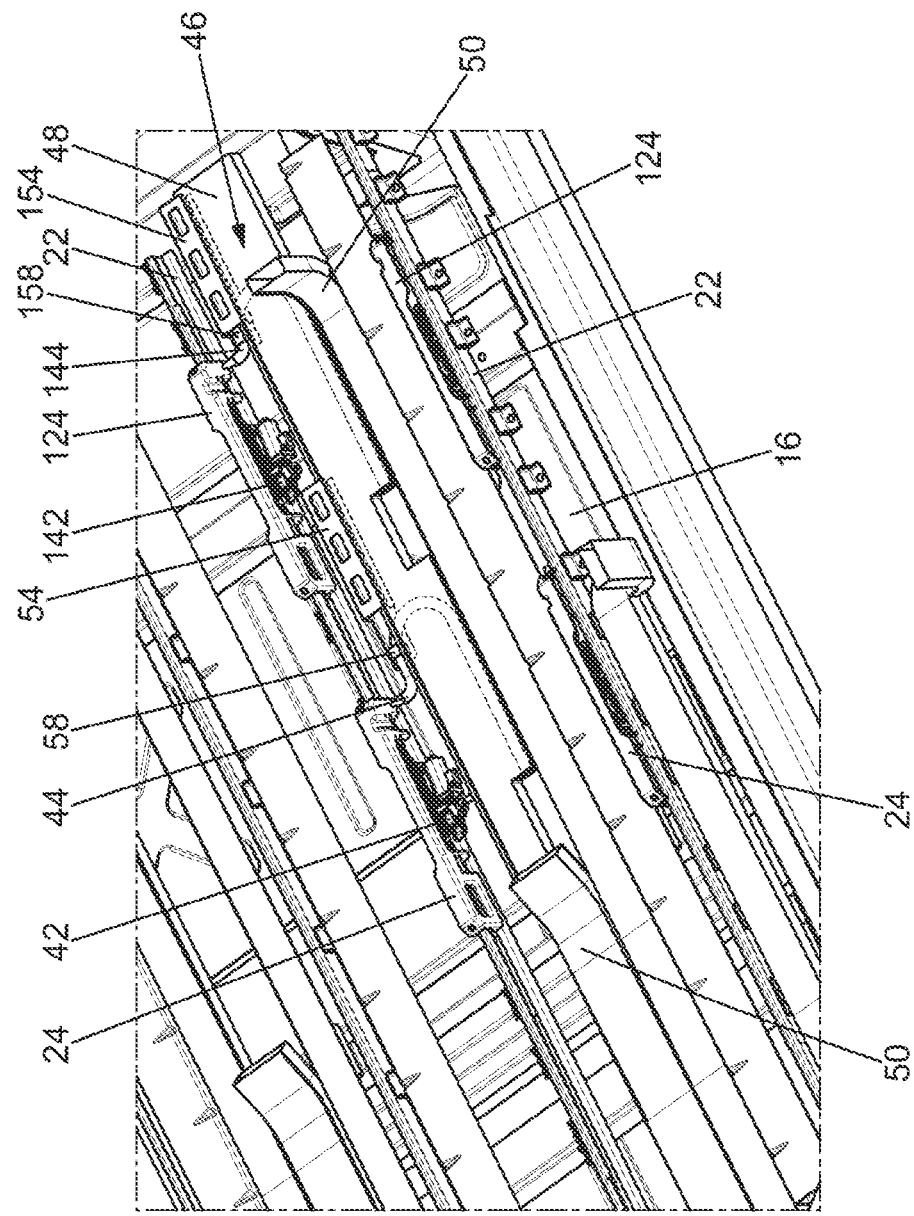

The detailed description particularly refers to the accompanying figures in which:
 FIG. 1 schematically represents a side view of an example of a vehicle seat mounted in a vehicle;
 FIG. 2 schematically represents a front view of the vehicle seat example from FIG. 1;
 FIG. 3 schematically represents a cross section of an example of a track covering device that may be implemented in cooperation with the seat from FIGS. 1 and 2;
 FIG. 4 schematically represents in perspective an example of the assembly of two vehicle seats on a same fixed rail disposed under the floor of the vehicle passenger compartment;
 FIG. 5 represents a view similar to FIG. 4, the two vehicle seats having been removed;
 FIG. 6 illustrates a detail from FIG. 5; and
 FIG. 7 represents a view similar to FIG. 5, corresponding to another position of the vehicle seats.

DETAILED DESCRIPTION

In the rest of the description, elements that are identical or that have identical functions bear the same reference sign. These elements are not described in detail with regard to each figure. On the contrary, for the sake of brevity of the present description, only the differences between the various examples are described in detail.

FIGS. 1 and 2 represent a seat 10 of a vehicle, in this case an automotive vehicle, that comprises a back 12 supported by a seating portion 14, itself mounted slidingly on the bottom of body (or chassis) 16 of vehicle 18, in a substantially horizontal longitudinal direction X.

The seating portion 14 is connected to the bottom of body 16 by two parallel tracks 20, extending in the longitudinal direction X.

Each of tracks 20 comprises an electric power-operated drive mechanism. The electric power-operated drive mechanisms of the two tracks 20 are synchronously controlled by a central electronic unit (for example, a microcontroller or similar) according to the commands received in particular from a bidirectional control button B or similar, operable by a user occupying seat 10.

Each track 20 comprises a first track element 22 and a second track element 24 mounted slidingly on first track element 22 along the longitudinal direction X. One of these first and second track elements 22, 24 is connected to the bottom of the body 16 of vehicle 18, the other of these first and second track elements 22, 24 is connected to seating portion 14, here via a joining bracket 26. In the example represented, first track element 22 is integral with the bottom of body 16, such that it forms a fixed rail 22. Second track element 24 is integral with the seating portion 14, such that it forms a mobile rail 24. The opposite would, however, be possible.

First track element 22 may generally be a section, for example in metal. Second track element 24 may be a mobile section, particularly in metal, or another rigid element, mounted slidingly on first track element 22.

First track element 22 of each track 20 may, for example, present a C shape opened horizontally towards the other track 20 of seat 10.

In the example illustrated, first track element 22 is a female element receiving second male track element 24.

In addition, in the example illustrated, seat 10 also comprises a headrest 28, fixed on the back 12.

Here vehicle 18 is equipped with a track 20 covering device 30.

An example of covering device 30 is illustrated in FIG. 3. According to this example, covering device 30 comprises a band 32 for covering the track 20 and at least one guide support 34, here two guide supports 34, by sliding the cover band 32 over track 20. Here, guide supports 34 support the cover band 32 on each side of the band. To do this, each guide support 34 forms a substantially cylindrical housing 35 with a shape suitable for receiving a lateral end (or side) of the cover band 32. Guide supports 34 thus enable an acceptable rigidity of the cover band 32 extending above the track to be provided. In addition, each housing 35 forms a groove receiving or enveloping a lateral side of the cover band 32. Here "enveloping" is understood to mean that the housing 35 prevents an upward or downward vertical displacement of the side of the cover band 32 that it receives and also prevents a transverse displacement of this side of the cover band 32, in a direction opposite to the other side of the cover band 32. Thus, the housings 35 limit or even prevent the transverse movements of the cover band 32, particularly on its lateral sides in relation to each other. In this way, the housings 35 forming a longitudinally extending groove ensure the longitudinal guiding of the sliding of cover band 32.

The cover band 32 is generally flexible, preferably enabling a winding of this cover band 32 around a transverse axis. For example, the cover band 32 is in a woven material.

Here, the cover band 32 comprises reinforcing elements 36. Here, reinforcing elements 36 take the form of longitudinal rods 38 integral with the cover band 32. Here, by way of example, the cover band 32 forms two substantially cylindrical lateral housings, each receiving a reinforcing rod 38. Alternatively, rods 38 may be fixed to cover band 32 by any means accessible to the person skilled in the art, for example by bonding. Reinforcing rods 38 are, for example, in metal or in plastic.

The cover band is advantageously integral with seat 10, for example by being fixed to joining bracket 26 at one of its longitudinal ends. Thus, the displacement of the seat 10 by means of the tracks 20, causes the displacement of the cover band 32 which, thus, still covers the tracks 20. The other end of the cover band 32 may be connected to a winding device, particularly in the case where two cover bands 32 or even two covering devices 30 are implemented by track 20, one in front of the seat 10, the other behind the seat 10. However, alternatively, the other end of the cover band 32 may also be integral with the seat 10, for example by being fixed to the joining bracket 26, on a face opposite to the first end of the cover band. One or more bevel gear systems, for example comprising pulleys or rollers, may then be implemented to guide the cover band 32. In this case, a portion of the cover band 32 preferably extends under the track 20.

The guide supports 34 may be separate pieces, fitted onto the body 16 or onto a floor 40 covering the bottom of the body 16 of the automotive vehicle 18. Alternatively, however, the guide supports 34 may be formed in a single piece, which may be either fitted onto the body 16 or the floor 40, or be the body 16 or the floor 40. The floor 40 may also be formed by body 16.

As illustrated in FIG. 4, two seats 10, 110 may be mounted on a same fixed rail 22.

Below, elements relating to the second seat 110 bear the same reference number as the identical element relating to the first seat 10, previously described, increased by one hundred (100). Unless otherwise stated, elements relating to the second seat 110 are described as "second," elements relating to the first seat 10 being described as "first."

The second seat 110 is fixed to a second mobile rail 124 via a second joining bracket (not seen in the figures). Here the second mobile rail 124 is mobile in relation to the same fixed rail 22 as the first mobile rail 24.

As is more clearly seen in FIG. 5, a first actuator 42 is here provided to displace the first mobile rail 24 in relation to the fixed rail 22. The first actuator 42 is electrically powered via a first electrical cable 44. The first electrical cable 44 thus connects the first actuator 42 to an electric power supply that may, in particular, be an automotive vehicle battery or any other source of electric energy, particularly an automotive vehicle alternator.

To limit the risk of the first electrical cable 44 being jammed between the first mobile rail 24 and the fixed rail 22, a guiding device 46 is provided here.

The guiding device 46 first comprises a housing 48. The housing 48 is hollow, to receive a portion of the first electrical cable 44. Here the housing 48 is disposed between the bottom of the body 16 and the floor 40 of the passenger compartment, not represented in FIG. 5. Here, for example, the housing 48 is disposed near the air ducts 50 traversing the space between the bottom of the body 16 and floor 40 of the passenger compartment, each opening near a respective seat 10, 110.

The housing 48 is, for example, in a plastic material.

The housing 48 presents a section in essentially a "U" shape, with an opening 53 in the direction of fixed rail 22 and mobile rails 24, 124.

The housing 48 also presents at least one second opening distinct from opening 53 with the "U"-shaped section of housing 48. This second housing 48 opening enables the first electrical cable 44 to enter into the housing 48, near the electrical energy source. This second opening 48 may also be arranged at one longitudinal end of the housing 48, oriented towards the front or rear of the automotive vehicle when the housing 48 is mounted in the automotive vehicle. Thus, the second opening of the housing 48 enables the first electrical cable 44 to be more easily connected to the electrical energy source implemented to power the first actuator 42.

Yet again, the housing 48 presents, according to the illustrated example, a slot 52 on each of its upper and lower faces. Each slot 52 here is rectilinear. The slots 52 extend along the opening 53 of the housing 48, oriented towards the fixed rail 22 and the mobile rails 24, 124. The slots 52 thus extend parallel to fixed rail 22.

The guiding device 46 also comprises a first slide 54.

The first slide 54 is, for example, in plastic.

The first slide 54 is mounted slidingly on the housing 48.

Here, to that end, the first slide 54 comprises a first portion 54*a* with a "U"-shaped section, opened towards the opening 53 of the "U"-shaped section of the housing 48. This enables the passage of the first electrical cable 44 to be guided from inside the housing 48 to outside the housing 48.

The first portion 54*a* with a "U"-shaped section of the first slide 54 also contributes to protecting the first cable 44 in that it forms a wall inserted between the portion of the first cable 44 received in the housing 48 and fixed 22 and mobile 24 rails.

The ends of the "U"-shaped portion of the first section 54*a* of the slide 54 form raised protrusions 56, each received in a respective slot 52 of the housing 48. Thus, the cooperation of the raised protrusions 56 and the slots 52 enables the first slide 54 to be guided in relation to the housing 48.

In addition, the first slide 54 comprises a substantially flat second portion 54*b*. Here, the flat second portion 54*b* extends in line with the lower face of the first portion. The second portion may present a flange on its side oriented towards fixed 22 and mobile 24 rails, also to prevent the first cable 44 from entering into contact with one of the fixed 22 and mobile 24 rails. The flange extends, for example, at a right angle in relation to the rest of flat second portion 54*b*.

A first means 58 for fixing the first cable 44 is provided on this second portion 54*b*. Here, this fixation means takes the form of a "U"-shaped hook 58, sandwiching the first cable 44 with the second portion 54*b*. The fixation means 58 may enable a relative movement of the first cable 44 in relation to the slide 54. In particular, the first fixation means 58 may enable the first cable 44 to unfold out of the housing 48 or, conversely, to fold up into the housing 48. In other words, the first fixation means 58 may enable the length of the first cable 44 extending between the first fixation means 58 and the first actuator 42 to be varied.

Preferably, however, the first fixation means 58 enables the first cable 44 to be held in position with relation to the slide 54. In this case, the cable 44, particularly the portion of the cable 44 extending between the fixation means 58 and its end connected to the mobile rail 24, is immobile in relation to the slide 54.

As seen in FIGS. 5 and 7, in particular, the guiding device 46 here comprises a second slide 154 slidingly mounted on the housing 48. The second slide 154 may be identical to the first slide 54. The second slide 154 may be associated with a second electrical cable 144 implemented to electrically power the second actuator 142 associated with the second seat 110.

As seen in the figures, the first and second slides 54, 154 are then arranged one behind the other along a side of the housing 48.

As seen by comparing, in particular, FIGS. 5 and 7, each slide 54, 154 is displaced by the movement of the associated mobile rail 24, 124. In fact, the displacement of a mobile rail 24, 124 causes a displacement of the associated electrical cable 44, 144 that pulls or pushes the corresponding slide 54, 154, due to the fact that the electrical cable 44, 144 is connected to the slide 54, 154 by a respective fixation means 58, 158. In addition, the associated electrical cable 44, 144 may move further inside the housing 48 or, conversely, may extend further outside the housing 48, according to the movement of the associated mobile rail 24, 124. Thus, the length of the electrical cable 44, 144 extending outside the housing 48, which could interfere with the fixed rail 22 and/or the mobile rail 24, 124, is limited. In addition, this portion of the electrical cable 44, 144 extending outside the housing 48 is guided due to the presence of the fixation means 58, 158 and, also, due to the shape of the slide 54, 154.

Alternatively, when the fixation means 58, 158 immobilizes at least one portion of the electrical cable 44, 144 in relation to the associated slide 54, 154, the length of the electrical cable 44, 144 extending between the fixation means 58, 158 and the associated mobile rail 24, 124 remains substantially constant. Also, in this case, the movement of the rail 24, 124 causes the slide 54, 154 to move, which also limits the length of the electrical cable 44, 144 extending outside the housing 48, which could interfere with the fixed rail 22 and/or the mobile rail 24, 124. This solution appears to be preferred.

It should be noted that the displacements of the mobile rails 24, 124 and thus of the associated slides 54, 154, may be independent of each other. In this case, the displacement of the front seat 10 is independent from displacement of the rear seat 110. Alternatively, the displacements of the mobile rails 24, 124 and thus of the associated slides 54, 154, can be coordinated. In particular, the displacements of the two mobile rails 24, 124 and thus of the associated slides 54, 154 may be identical.

It should be noted that according to the illustrated example, an electrical cable powers only one side of each seat. Indeed, it appears to be preferable to power the actuator, if any, on the other side of the seat via an electrical cable traversing the relevant seat. Therefore, the number of cables likely to be displaced under the floor of the passenger compartment that could interfere with a mobile or fixed rail could be limited.

The present disclosure is not limited to the examples described above. On the contrary, the present disclosure is able to provide numerous variations accessible to the person skilled in the art.

Thus, the guiding device described is implemented to guide two electrical cables, each associated with a respective actuator of a respective mobile rail. However, the guiding device may only guide a single electrical cable. In this case, of course, the guiding device may only comprise a single slide.

A vehicle seat may be fixed to the body of the vehicle via tracks that enable the longitudinal position of the seat to be adjusted. This is intended to improve the comfort of the seat occupant, who can adjust the position of the seat to his height, and in particular to the length of his legs. In one comparative example, the longitudinal adjustment of the seat position has been limited. Therefore, the comparative tracks used are relatively short, generally shorter than the length of the vehicle seat. Under these conditions, the comparative tracks are concealed under the vehicle seat itself.

However, in autonomous vehicles in particular, the adjustment range of the longitudinal position of a seat may be increased. In certain cases, tracks that are longer than the vehicle seat may be implemented. In this case in particular, the tracks may be seen by the vehicle occupants, at least in certain seat positions and this is unsightly. Such a configuration also leads to a risk of foreign objects falling onto the track. These foreign objects may impair the proper operation of the track. High heels, for example, may also get stuck in the track, from which they cannot be removed without being damaged.

Comparative systems comprising two lips extending on each side of the track and covering the track such that when the seat passes, these lips separate to enable the seat to slide. In this case, the comparative track is disposed under the floor of the passenger compartment in which the seat is arranged.

However, this comparative solution leads to new problems. In particular, in certain cases, the cable supplying the track actuator may become jammed. It is then difficult to act on the cable, disposed under the floor of the passenger compartment.

The present description aims to provide a solution to this problem.

To this end, a device for guiding at least one electrical cable for powering a vehicle seat track actuator is proposed, comprising:
- a housing adapted to receive at least one portion of the electrical cable;
- a slide slidingly mounted on the housing; and
- a means for fixing the electrical cable onto the slide.

Thus, advantageously, the cable is guided by the slide and is protected, in large part, by the housing. It is thus possible to limit or even prevent the risk of the cable interfering with the track.

The cable guiding device may comprise one or more of the following characteristics, taken alone or in combination:
- the housing has a "U"-shaped section, the "U"-shaped section being open on one side of the housing, at the level from which the slide is mounted;
- the slide presents a first portion with a "U"-shaped section;
- the opening of the "U"-shaped section of the housing is oriented towards the opening of the "U"-shaped section of the slide;
- the slide presents a second, substantially flat portion, the second portion preferably presenting a flange on a side intended to be oriented towards the track;
- the means for fixing the electrical cable onto the slide is arranged on the second portion of the slide;
- the fixation means is adapted to fixedly maintain at least one portion of the electrical cable extending between the fixation means and the track actuator, in relation to the slide;
- the fixation means comprises a "U"-shaped hook adapted to sandwich the electrical cable with a wall of the slide;
- the housing presents at least one opening distinct from the opening of the "U"-shaped section of the housing;
- the guiding device comprises a second slide mounted slidingly on the housing, the slide and the second slide preferably being identical; and
- the slide and the second slide are arranged one behind the other along a side of the housing.

According to another aspect, a track system for an automotive vehicle seat or seats is described, the system comprising:
- a track, comprising a fixed rail, a mobile rail and an actuator to displace the mobile rail in relation to the fixed rail;
- a cable fixed to the actuator; and
- a guiding device such as described above, in all its combinations, the cable being fixed to the slide.

The track system may comprise:
- a second mobile rail and a second actuator to displace the second mobile rail in relation to the fixed rail;
- a second cable fixed to the second actuator; the second cable being fixed to the second slide.

According to another aspect, a vehicle is described, in particular an automotive vehicle, comprising a body, at least one vehicle seat, a track system such as described above, in all its combinations, such that the fixed rail of the track is fixed to the body of the vehicle, and a floor, disposed on the body or formed by the body, the housing being disposed between the bottom of the body and the floor.

According to still another aspect, a method of implementing a track system such as described above is described, in all its combinations, comprising the step consisting of controlling a displacement of the mobile rail in relation to the fixed rail by means of the actuator, the displacement of the mobile rail causing a displacement of the cable that in turn causes the displacement of the slide.

A device (46) for guiding at least one electrical cable (44; 144) for powering a track actuator (42; 142) of a vehicle seat (10; 110), the device comprises a housing (48), adapted to receive at least one portion of the electrical cable (44; 144); a slide (54; 154), mounted slidingly on the housing (48); and a means (58; 158) for fixing the electrical cable (44; 144) onto the slide (54; 154).

The invention claimed is:

1. A device for guiding at least one electrical cable for powering a seat track actuator of a vehicle, comprising:
   a housing suitable for receiving at least one portion of the electrical cable;
   a slide mounted slidingly on the housing;
   a fixation means for fixing the electrical cable onto the slide;
   wherein the housing has a "U"-shaped section, the "U"-shaped section having an opening on a side of the housing at a level from which the slide is mounted, wherein the slide includes a first portion with a "U"-shaped section, and wherein the opening of the "U"-shaped section of the housing is oriented towards the "U"-shaped section of the slide.

2. The guiding device according to claim 1, wherein the slide includes a second, substantially flat, portion.

3. The guiding device according to claim 2, wherein the second portion has a flange on a side intended to be oriented towards the track.

4. The guiding device according to claim 2, wherein the fixation means for fixing the electrical cable onto the slide is arranged on the second portion of the slide.

5. The guiding device according to claim 1, wherein the fixation means is adapted to fixedly maintain at least one portion of the electrical cable extending between the fixation means and the seat track actuator, in relation to the slide.

6. The guiding device according to claim 1, wherein the fixation means comprises a "U"-shaped hook adapted to sandwich the electrical cable with a wall of the slide.

7. The guiding device according to claim 1, wherein the housing has at least one opening distinct from the opening of the "U"-shaped section of the housing.

8. The guiding device according to claim 1, comprising a second slide mounted slidingly on the housing.

9. The guiding device according to claim 8, wherein the slide and the second slide are identical.

10. The guiding device according to claim 8, wherein the slide and the second slide are arranged one behind the other along a side of the housing.

11. A track system for an automotive vehicle seat or seats comprising:
- a track, comprising a fixed rail, a mobile rail and an actuator to displace the mobile rail in relation to the fixed rail;
- a cable fixed to the actuator; and
- a guiding device according to claim 1, the cable being fixed to the slide.

12. The track system according to claim 11, the guiding device comprising a second slide mounted slidingly on the housing, the track system comprising:
- a second mobile rail and a second actuator to displace the second mobile rail in relation to the fixed rail;
- a second cable fixed to the second actuator;
- the second cable being fixed to the second slide.

13. A vehicle comprising a body, at least one vehicle seat, a track system according to claim 11, such that the fixed rail of the track is fixed to the body of the vehicle, and a floor, disposed on the body or formed by the body, the housing being disposed between a bottom of the body and the floor.

14. The vehicle according to claim 13, wherein the vehicle is an automotive vehicle.

15. A method for implementing a track system according to claim 11, comprising a step of displacing the mobile rail in relation to the fixed rail by means of the actuator, the displacement of the mobile rail causing a displacement of the cable that in turn causes the displacement of the slide.

16. A method for implementing a track system according to claim 11, comprising a step of displacing the mobile rail in relation to the fixed rail by means of the actuator, the displacement of the mobile rail causing a displacement of the cable that in turn causes the displacement of the slide.

* * * * *